United States Patent
Nielson et al.

(10) Patent No.: US 7,526,416 B2
(45) Date of Patent: Apr. 28, 2009

(54) METHOD, PROCESS AND COMPUTER PROGRAM TO AUTOMATICALLY CREATE A CUSTOMIZED THREE-DIMENSIONAL NAIL OBJECT BY WELDING

(75) Inventors: Scott L Nielson, Layton, UT (US); Craig P Gifford, West Jordan, UT (US)

(73) Assignee: American Equities Management, LLC, South Lake, TX (US)

( * ) Notice: Subject to any disclaimer, the term of this patent is extended or adjusted under 35 U.S.C. 154(b) by 0 days.

(21) Appl. No.: 10/710,961

(22) Filed: Aug. 15, 2004

(65) Prior Publication Data
US 2006/0036415 A1  Feb. 16, 2006

(51) Int. Cl.
*G06G 7/48* (2006.01)
(52) U.S. Cl. ............... 703/6; 703/1; 382/154; 700/117
(58) Field of Classification Search ........... 703/2, 703/6, 1; 424/61; 264/248; 382/154; 700/117, 700/161; 345/646
See application file for complete search history.

(56) References Cited

U.S. PATENT DOCUMENTS

| 2004/0143359 | A1* | 7/2004 | Yogo et al. ............. 700/161 |
| 2006/0033758 | A1* | 2/2006 | Nielson et al. .......... 345/646 |
| 2006/0034507 | A1* | 2/2006 | Nielson et al. .......... 382/154 |

OTHER PUBLICATIONS

Wu et al., J.Z. A Structural Fingertip Model for Simulating of the Biomechanics of Tactile Sensation, Medical Engineering & Physics, vol. 26, No. 2, Mar. 2004, pp. 165-175.*

* cited by examiner

*Primary Examiner*—Russell Frejd
(74) *Attorney, Agent, or Firm*—Clayton, Howarth & Cannon, P.C.

(57) ABSTRACT

The invention is a method, process and computer program to automatically create a customized three-dimensional artificial nail object by welding based upon an actual/existing digitized nail surface. This particular invention generates the overall desired three-dimensional nail object by taking the digitized nail surface and welding it to a preexisting desired nail tip thus creating a preferred artificial nail object. The application of the invention results in a wide scope of possible implementations including a use for creating artificial fingernails and artificial toenails.

33 Claims, 4 Drawing Sheets

METHOD, PROCESS AND COMPUTER PROGRAM TO AUTOMATICALLY CREATE A CUSTOMIZED THREE-DIMENSIONAL NAIL OBJECT BY WELDING

CROSS REFERENCE TO RELATED APPLICATIONS

This application references U.S. patent application Ser. No. 10/708,065, filed Feb. 6, 2004.

BACKGROUND OF INVENTION

While working with fingernails and fingernail objects for several years, there was no easy way to automatically create a three-dimensional model of an artificial fingernail object. In fact, most software in the market allows a user to manually manipulate and create just about any three-dimensional object conceivable, but the process of doing this manually is very time consuming and allows for too much human error when creating artificial fingernails with a consistent and reliable appearance. Because of this the inventors set out to find a method to create artificial fingernail objects automatically and this invention was the result.

One simple way to create the desired artificial nail object is to imitate the existing Artificial Nail Industry. Currently, when a consumer wants an artificial fingernail applied, they will have a preexisting nail tip attached (by glue or acrylic) to their natural nail and then the nail technician will hand build the rest of the artificial fingernail with an acrylic or some other similar type product, where the final result is a desired, beautiful artificial fingernail. By creating a variety of three-dimensional tips similar to that of the existing market, the inventors were able to successfully imitate the nail technician process. The problem to overcome was to determine the rest of the desired three-dimensional fingernail object as at this point in the process a bottom surface and tip existing, but a remaining top surface that was blended with the tip needed to be generated. To solve this problem, the inventors decided to duplicate the three-dimensional representation of the clients existing nail surface and then apply a smoothing and blending function to this surface, and then attach it to the nail tip, resulting in the desired three-dimensional artificial fingernail object.

The advantage of this invention is that with relative ease and very little labor a desired customized and preferred three-dimensional artificial nail object can be created. This invention has many applications, particularly with fingernail and toenails. This new desired three-dimensional object has many applications, not the least of which is the ability to physically create the nail object for the individual and supply them with an artificial nail for use as a cosmetic or even prosthesis. The invention can now safe time and virtually guarantee consistent looking fingernail objects, all accomplished with relative ease.

SUMMARY OF INVENTION

The invention is a method, process and computer program to automatically create a customized three-dimensional artificial nail object by welding based upon an actual/existing digitized nail surface. This particular invention generates the overall desired three-dimensional nail object by taking the digitized nail surface and welding it to a preexisting desired nail tip thus creating a preferred artificial nail object. The application of the invention results in a wide scope of possible implementations including a use for creating artificial fingernails and artificial toenails.

DETAILED DESCRIPTION

By starting with an existing digitized three-dimensional surface point array of an actual fingernail or toenail, the invention permits the automatic creation of a new customized three-dimensional object that will fit over the actual fingernail or toenail. This is accomplished by measuring key points of data contained in the digitized array.

The key points are measurement values in millimeters or inches along the X-axis, Y-axis and Z-axis. Further, the arcs and curves of the digitized nail surface are also determined along the X-axis and Y-axis. Additional key points are found in the periphery points along the tip of the digitized nail surface.

Once the key points are evaluated, a selection process is handled whereby preexisting representations of three-dimensional nail tips are compared and the best fitting nail tip that also represents the desired overall appearance is then manipulated and utilized.

In order to successfully create the desired customized nail object an additional top surface must be created. This is achieved by duplicating the digitized nail surface and raising the duplicated surface along the Z-axis to a desired depth. In many cases the digitized nail surface will need to be smoothed and blended to match the selected nail tip. Smoothing is achieved by comparing each data point in the array of points contained in the duplicated nail surface and verifying that each point falls within a specified acceptable range of the smoothing function. If a point falls outside the range, then it is changed along its X-axis, Y-axis or Z-axis accordingly. Blending occurs in much the same way but is focused on the intersection points between the selected nail tip and the duplicated top surface.

Once the duplicated nail surface has been created all three objects are then combined to form one new preferred and desired three-dimensional nail object. This is achieved by aligning the duplicated surface to the top of the selected nail tip, this is then combined with the digitized nail surface and aligned along the bottom of the selected nail tip with the digitized nail surface to form the bottom of the new nail object. The result is a new customized three-dimensional nail object that has the desired appearance and will fit over the digitized nail surface.

Figure 1:
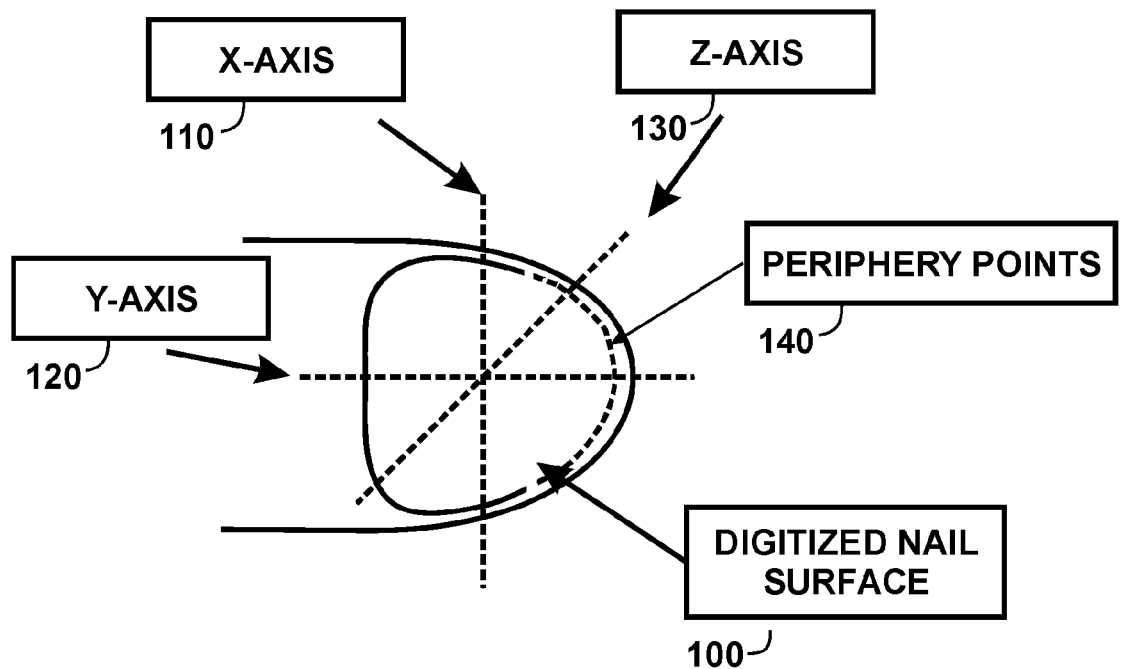
FIG. 1 is a diagram demonstrating the Axis, periphery and digitizing of the nail surface object.
Figure 2:
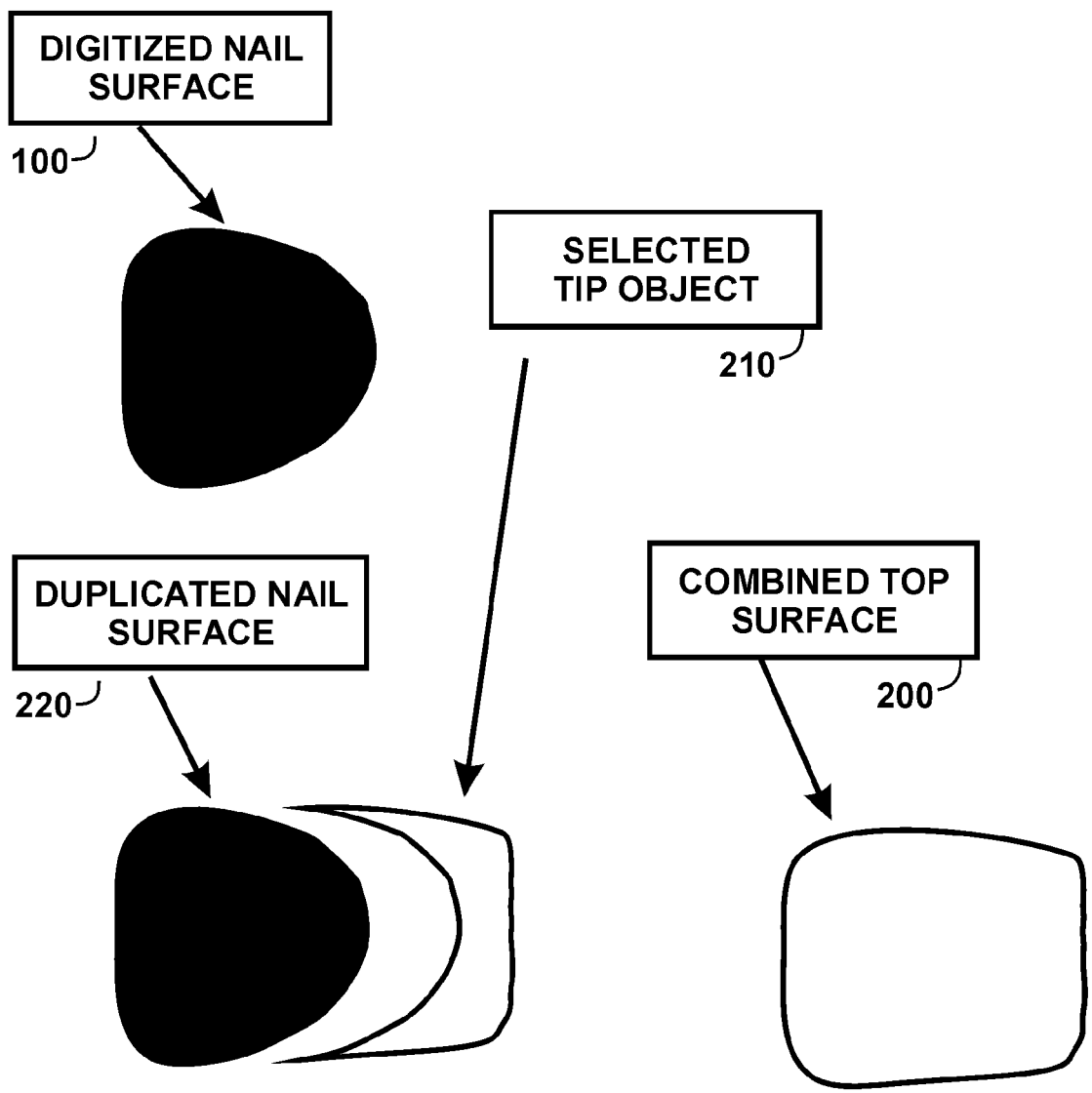
FIG. 2 is a diagram illustrating the tip selection process, welding the tip to the duplicated nail surface.

In FIG. 1 the first step of the process is demonstrated, where a digitized nail surface 100 is shown and the orientation of the X, Y and Z Axis is established. Here the X-axis 110 is found along the width of the digitized nail surface 100; the Y-axis 120 is the length of the digitized nail surface 100 and can be determined initially by measuring from the cuticle to the tip of the digitized nail surface 100; and the Z-axis 130 represents the height or depth of the digitized nail surface 100. Additionally, the periphery points 140 of the tip of the digitized nail surface 100 are also determined in the first step to insure that the digitized nail surface 100 dimensions will fit into the selected tip object 210. All of these reference points are utilized in the selection process for the selected tip object 210, which will eventually be manipulated to create the new three-dimensional data representing the final three-dimensional customized nail object 400.

Measuring the digitized surface area includes creating a relationship of the X-axis 110, Y-axis 120 and Z-axis 130 to millimeters or inches, further arcs and curves of the digitized nail surface 100 are determined by measuring and creating relationships between the three-dimensional points of data along the X-axis 110, Y-axis 120 and Z-axis 130. These curves and arcs are utilized and manipulated during the smoothing process and during the tip selection 210 process, in an effort to make the combined top surface 200.

By utilizing the periphery points 140 along the tip of the digitized nail surface 100 as reference points, the selection of the preferred tip object 210 is facilitated.

Once the tip object 210 is selected, then the digitized nail surface 100 is duplicated to create an eventual top surface.

The duplicated nail surface 220 is raised on its Z-axis 130 to a determined depth so as to create a preferred depth to the customized nail object 300. Often, the duplicated nail surface 220 will require smoothing to insure the appearance of the top surface 200 is desired. The smoothing process is achieved by comparing points along the X-axis 110, Y-axis 120 and Z-axis 130 to its surrounding points and if a point falls outside the preferred range, that point is manipulated accordingly to the smoothing function and brought into the scope of its surrounding points in three-dimensional space.

Once the duplicated nail surface 220 has been smoothed, it will be attached to the top surface of the selected tip object 210. The intersection between the two objects will often need to be blended. The blending process operates much in the same way as the smoothing process in that the corresponding points of the intersection are compared and if the intersecting points fall outside of a desired range, they are manipulated to be in harmony with the desired range and thus blending the duplicated nail surface 220 with the selected tip object 210. This results in a combined top surface 200 that will be added too by the digitized nail surface 100 in the next step.

Figure 3:
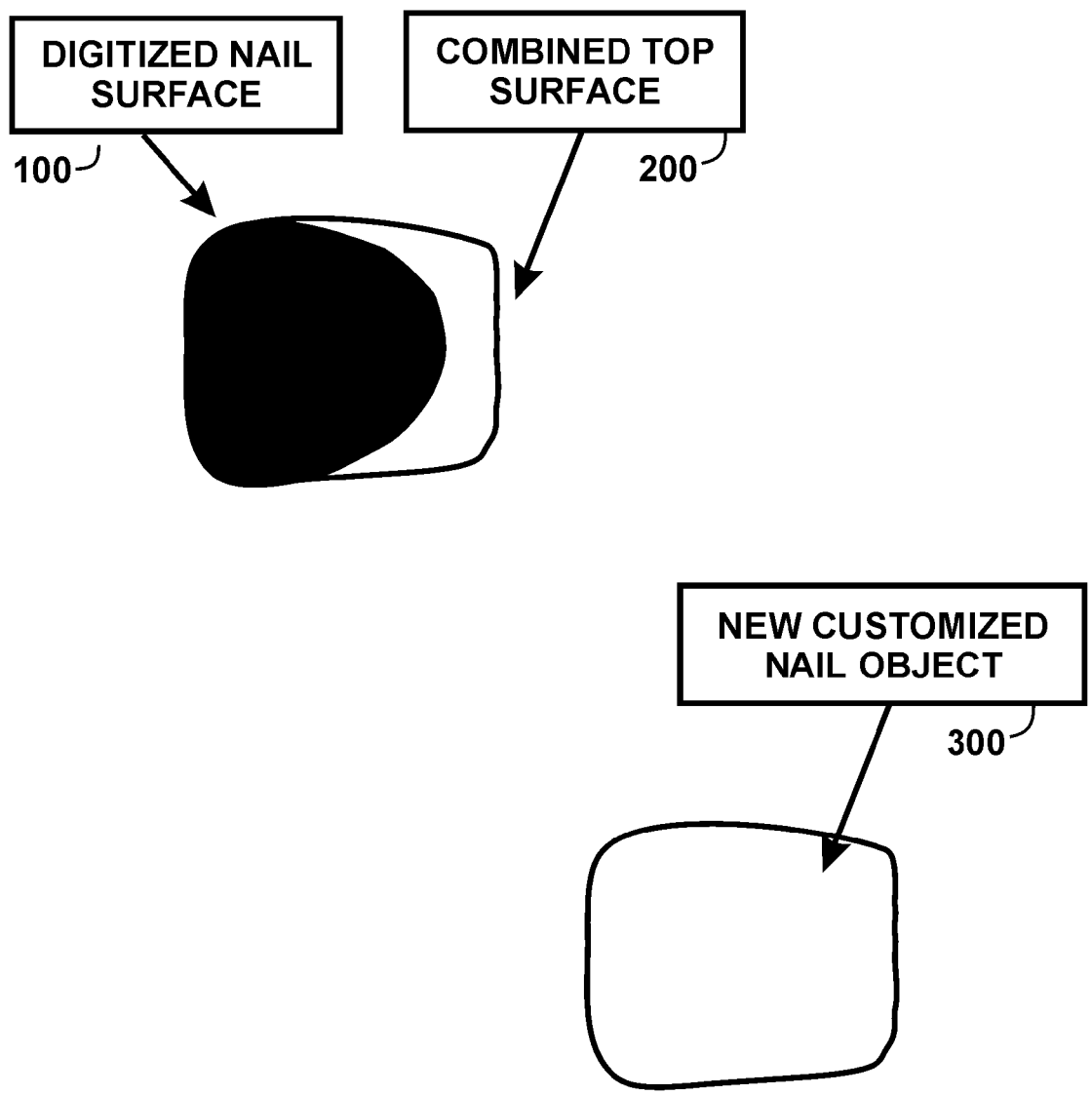
FIG. 3 is a diagram showing the welding of the selected tip, duplicated nail surface and the digitized nail surface.

FIG. 3 shows the combination of the combined top surface 200 with the digitized nail surface 100 thus creating a new customized nail object 300. This combination occurs by aligning the bottom of the selected tip object 210 with the bottom of the digitized nail surface 100. Once all three objects (duplicated nail surface 220, selected tip object 210 and digitized nail surface 100) are properly aligned, smoothed and blended, they are combined to form a new customized nail object 300.

Figure 4:
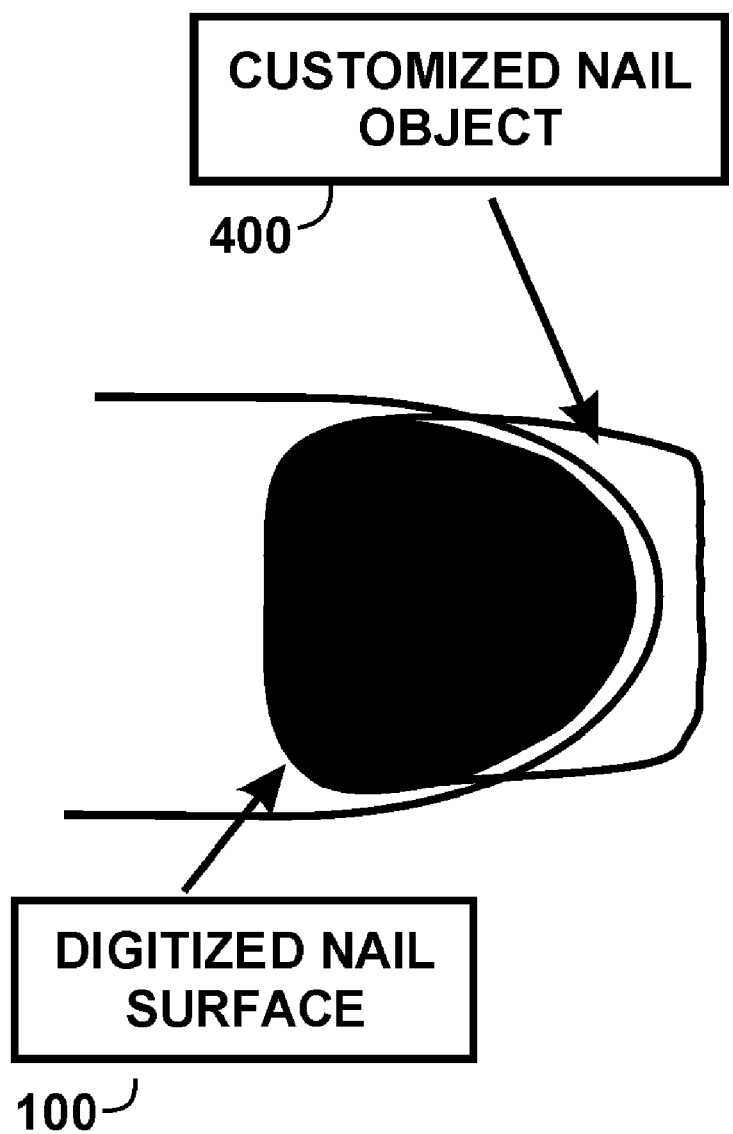
FIG. 4 is a diagram showing the new customized nail object fitting over the digitized surface.

FIG. 4 shows the new customized nail object 300 as one customized nail object 400, fitting over the top of the original digitized nail surface 100.

By completing the steps above, virtually any software program or user would be capable of creating a desired and customized three-dimensional artificial nail object. The entire objective of the preferred embodiments of the invention has been to create a simplified method, process and computer program to automatically create a customized three-dimensional nail object by welding preexisting nail tips with an existing nail surface into a preferred artificial nail object. The application of this invention is extensive and plentiful, as with this invention it will become trivial to generate desired three-dimensional artificial nail objects by automation quickly and easily. Because of the advantages inherent in this invention it is anticipated that many variants of this invention are possible, which should be included within the preferred embodiments and descriptions of this invention.

The invention claimed is:

1. A method of creating a three-dimensional nail object, comprising:
   receiving, in a processor, a three-dimensional array of data representing a digitized nail surface including receiving data in the form of key reference points on a tip of the digitized nail surface along the X-axis, Y-axis, and Z-axis of said digitized nail surface and further receiving data representing a peripheral edge of the tip of the digitized nail surface;
   comparing the array of data received against a plurality of preexisting three-dimensional artificial nail tips and selecting one of the plurality of preexisting three-dimensional artificial nail tips that closely matches the key reference points of the digitized nail surface;
   creating a duplicate of the digitized nail surface and aligning the duplicate digitized nail surface on the Z-axis to align with a top value of the selected preexisting three-dimensional artificial nail tip, and;
   combining the preexisting three-dimensional artificial nail tip, the duplicated digitized nail surface and the digitized nail surface into a new artificial nail object that conforms to an expected result so that the new artificial nail object will fit over the digitized nail surface and create a desired artificial nail appearance.

2. The method of claim 1, wherein the three-dimensional array of data representing a digitized nail surface includes any data that can be used to represent a three-dimensional object.

3. The method of claim 1, wherein the three-dimensional array of data may be represented as points of data representing an X-axis, Y-axis and Z-axis said three-dimensional array of data may also include the points defining the periphery of the tip of the digitized nail surface.

4. The method of claim 1, wherein the method further includes determining a measurement value in millimeters or inches of the nail surface along its X-axis, Y-axis and Z-axis; where X-axis represents width, Y-axis represents the length and Z-axis represents depth.

5. The method of claim 1, wherein the method further includes determining the arc of the digitized nail surface along the X-axis and/or determining the arc of the nail surface along the Y-axis.

6. The method of claim 1, wherein the method further includes evaluating three-dimensional points along the periphery of the tip of the nail surface.

7. The method of claim 1, wherein the method further includes using the reference points to select and modify various nail tip objects that have been previously created which closely resemble a desired artificial nail tip.

8. The method of claim 1, wherein the step of creating a duplicate of a digitized nail surface includes replicating the three-dimensional points of the digitized nail surface and manipulating those points on the Z-axis to gain a desired thickness to the final customized nail object said replicated array of points will become part of the top surface of the customized nail object.

9. The method of claim 8, wherein the duplicate of three-dimensional nail surface may require a smoothing function in order for the top surface of the customized nail object to have a uniform and smooth appearance said smoothing is achieved by comparing all of the three-dimensional points to three-dimensional points next to each point and using a range parameter to determine if the point is out of sync with the desired smoothing function.

10. The method of claim 1, wherein the combination of the duplicated nail surface, the selected tip and the digitized nail surface includes aligning the selecting tip to the duplicated nail surface to form the top of the customized nail object and then aligning the digitized nail surface to the other objects to form the customized fit and bottom of the customized nail object.

11. The method of claim 1, wherein the desired nail object in its final state is a customized three-dimensional object representing an artificial nail that is desired, which fits over the digitized nail surface.

12. A process of creating a three-dimensional nail object, comprising:
receiving, in a processor, a three-dimensional array of data representing a digitized nail surface including receiving data in the form of key reference points on a tip of the digitized nail surface along the X-axis, Y-axis, and Z-axis of said digitized nail surface and further receiving data representing a peripheral edge of the tip of the digitized nail surface;
comparing the array of data received against a plurality of preexisting three-dimensional artificial nail tips and selecting one of the plurality of preexisting three-dimensional artificial nail tips that closely matches the key reference points of the digitized nail surface;
creating a duplicate of the digitized nail surface and aligning the duplicate digitized nail surface on the Z-axis to align with a top value of the selected preexisting three-dimensional artificial nail tip, and;
combining the preexisting three-dimensional artificial nail tip, the duplicated digitized nail surface and the digitized nail surface into a new artificial nail object that conforms to an expected result so that the new artificial nail object will fit over the digitized nail surface and create a desired artificial nail appearance.

13. The process of claim 12, wherein starting with a three-dimensional array of data representing a digitized nail surface includes any data that can be used to represent a three-dimensional object.

14. The process of claim 12, wherein the three-dimensional array of data may be represented as points of data representing an X-axis, Y-axis and Z-axis the three- dimensional array of data may also include the points defining the periphery of the tip of the digitized nail surface.

15. The process of claim 12, wherein measuring key reference points includes determining the measurement value in millimeters or inches of the nail surface along its X- axis, Y-axis and Z-axis; where X-axis represents width, Y-axis represents the length and Z-axis represents depth.

16. The process of claim 12, wherein measuring key reference points includes determining the arc of the digitized nail surface along the X-axis and/or determining the arc of the nail surface along the Y-axis.

17. The process of claim 12, wherein measuring key reference points includes evaluating three-dimensional points along the periphery of the tip of the nail surface.

18. The process of claim 12, wherein selecting a preexisting three-dimensional array of points resembling a preferred nail tip includes using the reference points to select and modify various nail tip objects that have been previously created which closely resemble a desired artificial nail tip.

19. The process of claim 12, wherein the duplicating of a digitized nail surface includes replicating the three-dimensional points of the digitized nail surface and manipulating those points on the Z-axis to gain a desired thickness to the final customized nail object said replicated array of points will become part of the top surface of the customized nail object.

20. The process of claim 19, wherein the duplicated copy of three-dimensional points may require a smoothing function in order for the top surface of the customized nail object to have a uniform and smooth appearance said smoothing is achieved by comparing all of the three-dimensional points to three-dimensional points next to each point and using a range parameter to determine if the point is out of sync with the desired smoothing function.

21. The process of claim 12, wherein the combination of the duplicated nail surface, the selected tip and the digitized nail surface includes aligning the selecting tip to the duplicated nail surface to form the top of the customized nail object and then aligning the digitized nail surface to the other objects to form the customized fit and bottom of the customized nail object.

22. The process of claim 12, wherein the desired nail object in its final state is a customized three-dimensional object representing an artificial nail that is desired, which fits over the digitized nail surface.

23. A computer program comprising a set of instructions stored on computer readable memory that are processed by a processor, comprising:
receiving a three-dimensional array of data representing a digitized nail surface
including receiving data in the form of key reference points on a tip of the digitized nail surface along the X-axis, Y-axis, and Z-axis of said digitized nail surface and further receiving data representing a peripheral edge of the tip of the digitized nail surface;
comparing the array of data received against a plurality of preexisting three-dimensional artificial nail tips and selecting one of the plurality of preexisting three-dimensional artificial nail tips that closely matches the key reference points of the digitized nail surface;
creating a duplicate of the digitized nail surface and aligning the duplicate digitized nail surface on the Z-axis to align with a top value of the selected preexisting three-dimensional artificial nail tip, and;
combining the preexisting three-dimensional artificial nail tip, the duplicated digitized nail surface and the digitized nail surface into a new artificial nail object that conforms to an expected result so that the new artificial nail object will fit over the digitized nail surface and create a desired artificial nail appearance.

24. The computer program of claim 23, wherein the three-dimensional array of data includes any data that can be used to represent a three-dimensional object.

25. The computer program of claim 23, wherein the three-dimensional array of data may be represented as points of data representing an X-axis, Y-axis and Z-axis said three-dimensional array of data may also include the points defining the periphery of the tip of the digitized nail surface.

26. The computer program of claim 23, wherein the program includes determining the measurement value in millimeters or inches of the nail surface along its X-axis, Y-axis and Z-axis; where X-axis represents width, Y-axis represents the length and Z-axis represents depth.

27. The computer program of claim 23, wherein the computer program includes determining the arc of the digitized nail surface along the X-axis and/or determining the arc of the nail surface along the Y-axis.

28. The computer program of claim 23, wherein the computer program includes evaluating three-dimensional points along the periphery of the tip of the nail surface.

29. The computer program of claim 23, wherein selecting a preexisting three-dimensional array of points resembling a preferred nail tip includes using the reference points to select and modify various nail tip objects that have been previously created which closely resemble a desired artificial nail tip.

30. The computer program of claim 23, wherein the duplicating of a digitized nail surface includes replicating the three-dimensional points of the digitized nail surface and manipulating those points on the Z-axis to gain a desired thickness to the final customized nail object said replicated array of points will become part of the top surface of the customized nail object.

31. The computer program of claim 30, wherein the duplicated copy of three-dimensional points may require a smoothing function in order for the top surface of the customized nail object to have a uniform and smooth appearance said smoothing is achieved by comparing all of the three-dimensional points to three-dimensional points next to each point and using a range parameter to determine if the point is out of sync with the desired smoothing function.

32. The computer program of claim 23, wherein the combination of the duplicated nail surface, the selected tip and the digitized nail surface includes aligning the selecting tip to the duplicated nail surface to form the top of the customized nail object and then aligning the digitized nail surface to the other objects to form the customized fit and bottom of the customized nail object.

33. The computer program of claim 23, wherein the desired nail object in its final state is a customized three-dimensional object representing an artificial nail that is desired, which fits over the digitized nail surface.

* * * * *